3,490,052
Patented Jan. 13, 1970

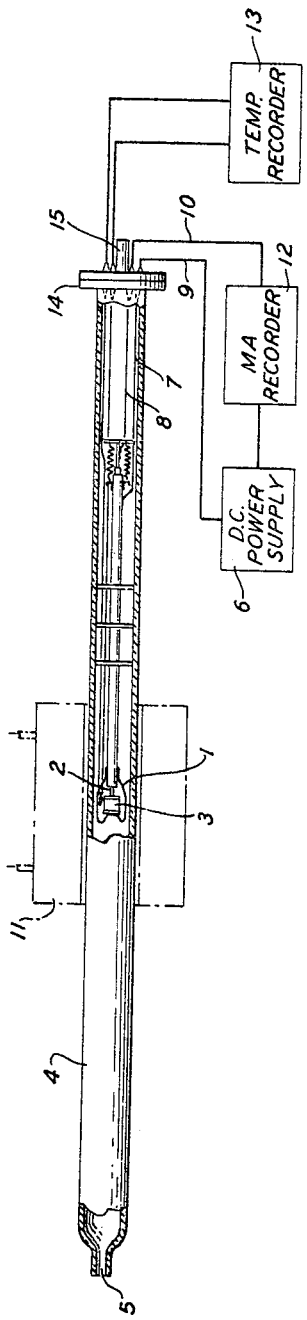
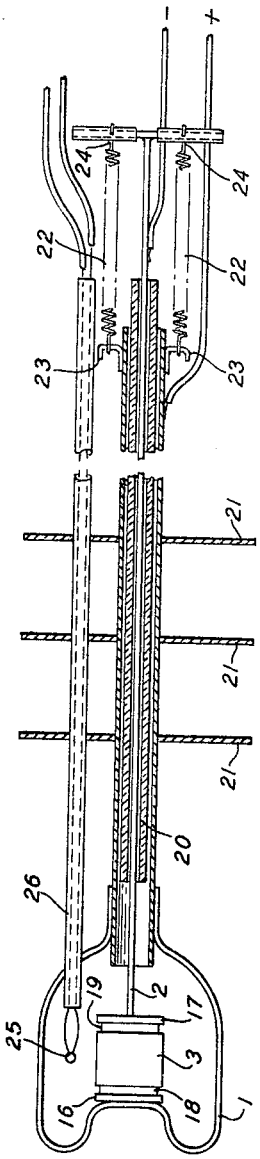

3,490,052
RARE EARTH-CONTAINING COMPOSITIONS AND PREPARATION OF SAME
Howard J. Guggenheim, Dunellen, and John V. Kane, Berkeley Heights, N.J., assignors to Bell Telephone Laboratories, Incorporated, New York, N.Y., a corporation of New York
Filed May 25, 1964, Ser. No. 369,930
Int. Cl. H01s 3/18
U.S. Cl. 331—94.5          16 Claims

ABSTRACT OF THE DISCLOSURE

The valence state of any of the type $4f$ and $5f$ rare earths contained as solutes in a divalent metal fluoride host such as calcium fluoride is reduced by heating and maintaining a voltage gradient across the material. The processed material may contain $4f$ elements in the divalent rather than the trivalent state.

---

This invention relates to rare earth-containing compositions and to methods for producing such materials, as well as to devices utilizing them. Rare earth-containing compositions here of concern are crystalline fluorides in which significant portions of rare earth inclusions are in a lower valence state than that which ordinarily occurs in such environment.

For the past few years, there has been an ever increasing interest in phosphorescent materials for a variety of purposes, inter alia lasers and scintillators. Many materials to which attention has been directed have utilized any of the rare earths, either of type $4f$ or type $5f$ (on the periodic table in accordance with Mendelyeev) for the emitting or active ion. The inclusion is naturally trivalent in lattices such as the tungstates and molybdates, and certain of these materials have resulted in CW operation.

While the upper valence level, generally trivalent, is beneficially typified by narrow line width of emission at various frequencies, it is known that the lower valence state, generally divalent, is oftentimes possessed of a considerably broader absorption spectrum while sharing some of the desirable features of the emission spectrum associated with the higher state. It is largely by reason of this characteristic, resulting in greater pump efficiency, that studies have been made of rare earth inclusions in divalent host lattices. From optical and growth considerations, certain of the fluorides, notably calcium fluoride, strontium fluoride, and barium fluoride, are desirable materials meeting the critical requirements of transparency, crystalline perfection, etc., all of which are recognized as necessary for the uses here under consideration. One such material, calcium fluoride containing divalent samarium, was the active material in one of the first reported operating lasers. Absorption and emission studies for virtually all the rare earths in this and other fluorides have followed.

It is unfortunately true that the expectation that rare earth inclusions in the divalent fluoride host lattice would prefer the lower valence state (generally divalent) is not fulfilled. For reasons which have never been satisfactorily explained, rare earth inclusions in such crystals are generally in the higher valence state. In fact, with the sole exception of europium, the natural valence state of the $4f$ rare earth in this environment is trivalent. Uranium of the $5f$ group is generally found in the tetravalent state in the fluoride host.

The difficulty of obtaining divalent rare earth inclusions in fluoride crystals has been recognized. The most often used procedure utilized in the preparation of the rare earth containing laser materials involves electron radiation. It was found that of the order of a few percent of the total rare earth inclusion could be so reduced to the more absorbent divalent state. This procedure has been used successfully for the reduction of relatively small fractions of all of the available rare earths (see 35 J. Chem. Phys. 1521 (1961)).

It is an accepted disadvantage of irradiated material that (1) only a minor fraction of the rare earth can be reduced and (2) resulting materials are unstable, that is, application of heat or prolonged periods at room temperature result in oxidation to the higher valence state.

In accordance with this invention, it has been discovered that application of an electrostatic field of from 1 to 100 volts across a fluoride crystal containing rare earth in the higher of its two stable valence states results in reduction of a significant fraction of the rare earth inclusion to its lower state. Since treatment time is significantly reduced by maintaining the crystalline material in a heated state, a preferred aspect of the invention is so defined.

Materials produced in accordance with this invention may contain larger fractions of divalent or other low valent state rare earth inclusion than has heretofore been produced. Resulting materials are more stable than those produced by irradiation. The advantage of utilizing the procedures herein applies to all of the rare earths, whether of type $4f$ or $5f$, in any divalent fluoride lattice. For the purposes toward which this invention is directed, the fluorides of calcium, strontium, and barium are preferred, in consequence of which use of such host materials constitute a preferred embodiment of the invention.

It is a matter of convenience that the upper valence state of the rare earths dissolved in an alkaline earth fluoride is invariably more transparent over the visible spectrum than is the lower valence state. In samarium, for example, the upper, trivalent, state is clear and water-white, while the lower, divalent, state, is a deep emerald green. The first observable fact when an electric field is applied to a crystal under treatment is the formation of, at first a lightly, and, finally, a heavily, colored stratum at the surface region in contact with the cathode. Once formed, this is followed by gradual enlargement of the color region representing the more absorbent lower state more or less at a planar interface separating this region from the more transparent higher valence state. Stopping the process at any point before ultimate conversion results in a crystal having two readily observable regions, one highly colored, one transparent, separated at a pronounced interface. This observation gives rise to conjecture as to the responsible mechanism. Such conjecture is supported by certain experimental facts and is therefore set forth below for whatever assistance it may be to those concerned with these processes. While a postulated mechanism is set forth, it is considered that claims appended hereto are adequately founded on observed results. No reliance is placed for scope or validity of such claims on this mechanism.

It is apparent that the existence of a rare earth inclusion in the trivalent or tetravalent state within the divalent host lattice requires the presence of a valence compensating ion. This function may be served by oxygen, which is known to be included substitutionally in any growth procedure in which pains are not taken to exclude this impurity. Fluoride crystals prepared for demanding use in lasers, scintillators and other critical phosphor devices are generally grown in such manner, or subsequently treated in such way, as to remove oxygen and introduce interstitial fluorine. See, for example 32 JAP 1137, 8 for July 1961 and 34 JAP 2482–5 for August 1963. Irradiation, insofar as it results in reduction of any rare earth ions, necessarily implies the addition of electrons to such ions.

Instability of the resulting materials, it is postulated, results from the continued presence of interstitial ions which are always available for balancing valences of oxidized rare earth ions. The electrostatic drift conditions produced herein result not only in the addition of an electron to each of the reduced rare earth ions but also in the migration of fluorine to the anode. Removal of this compensating influence dictates the preference of the rare earth ion for its reduced valence state and so results in the observed stability of the treated material. The observable progression of a sharp interface between reduced and upper valance states in the direction of the anode lends some support to this theory. The fact that conversion does occur in so clearly defined a region rather than in a gradual manner, together with the empirical finding that the phenomenon is dependent not on a given value of voltage gradient across the entire crystal between electrodes but rather on a fixed value of voltage regardless of crystal length suggests rare earth ionic conductivity (fluorine) ions in the clear region and increased electronic conductivity in the colored region, with the voltage drop being concentrated largely at the high effective resistivity junction position.

Description of the invention is expedited by the drawing, in which:

FIG. 1 is a cross-sectional view of apparatus suitable for the practice of this invention;

FIG. 2 is an expanded cross-sectional view of a section of the apparatus of FIG. 1;

Figure 3:
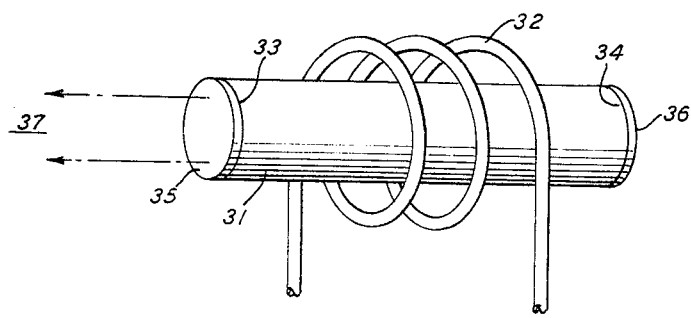
FIG. 3 is a perspective view of a laser utilizing a body of material produced in accordance with this invention.

Referring again to FIG. 1, the apparatus depicted comprises a support wire 1 and support rod 2 so arranged as to hold crystal 3 undergoing treatment. The entire assembly is enclosed by tube 4, within which a protective atmosphere introduced at inlet 5 is maintained. The apparatus shown provides for a flow of atmospheric gas, such gas exiting at 15. Direct-current bias produced by power supply 6 is applied across wire 1 and rod 2 by means of leads 7, 8, 9, and 10. The temperature of crystal 3 is maintained by furnace 11, which may operate on the resistance principle and receive its current from control source, not shown. The tube 4 is sealed from the atmosphere by O ring flange 14. Provision for recording current flow 12 and for recording temperature 13 complete the apparatus.

FIG. 2 is a detailed view, again showing support wire 1 and support rod 2. These members are constructed of a suitable nonreactive refractory material such as platinum. In this detail, it is seen that electrical contact is made to crystalline body 3 by means of metallic contacts 16 and 17. Such metallic contacts, however, are not placed in direct contact with crystalline body 3, provision being made for current flow through interpositioned, nonmetallic electrodes 18 and 19. Electrode materials for these interposed layers may suitably be composed of carbon. For the extremely critical use to which the instant processes are directed, it is considered mandatory to utilize anode and cathode contacts which are substantially free of any deleterious cations and anions, respectively, which may be caused to enter the crystalline body under treatment under the conditions stated. Under the conditions described, the cation, calcium, strontium, or barium, does drift and would, in consequence, react with any metallic ingredient contained in the cathode. Consequently, a conducting metal-free cathode is desired. Use of a platinum or other metallic anode results in reaction of such metal, presumably with drifting fluorine, which may result in surface and electrode damage. Platinum rod 2 is electrically insulated from the anodic platinum support wire 1 by means of tubular spacer 20. In the apparatus shown, heat is largely localized and maintained uniform in the position of crystal 3 by radiation deflectors 21. Springs 22, together with support means 23 and 24, maintain electrode pressure on crystal 3. Temperature sensing is accomplished by means of thermocouple 25, leads for which are brought into the hot zone through protection tube 26.

It should be kept in mind that the apparatus shown is a laboratory model, and that other arrangements may be preferred for commercial production.

In FIG. 3, there is shown a laser including a rod-shaped crystal 31 of a rare earth-containing fluoride crystal in accordance with this invention, this rod being of the approximate dimensions 2 inches in length and ¼ inch in diameter. Pump energy is supplied by means of electric lamp 32 encompassing rod 31 and connected to an energy source not shown. Ends 33 and 34 of rod 31, ground and polished to be optically flat and parallel, include silvered reflecting layers 35 and 36. Layer 36 is completely reflecting, while layer 35 is only partially reflecting, so permitting the escape of coherent radiation 37. The materials of the present invention may, of course, be used in other solid state laser configurations.

Figure 4:
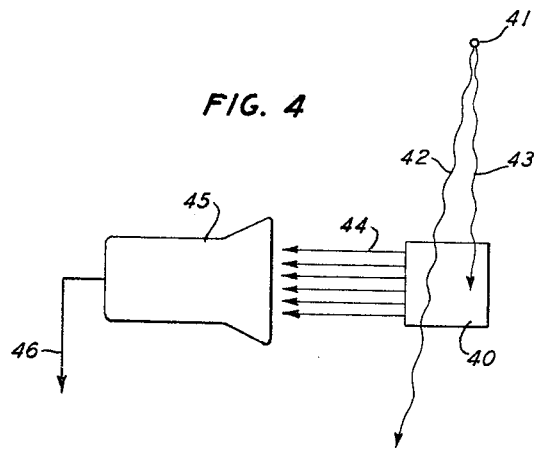
FIG. 4 is a diagrammatic plan view of another device utilizing a body of material produced in accordance with the processes herein.

FIG. 4 depicts a crystalline body 40 of rare earth-containing fluoride crystal in accordance with this invention, in this instance operating as a scintillation crystal. Gamma ray source 41 results in rays, some members of which 42 are not stopped by the crystal and typical members of which 43 are absorbed. The effect of absorbed gamma energy is to result in the ejection of an electron. Cascade processes follow, and if the crystal is thick enough this results in the almost complete conversion of the gamma ray energy into a shower of electron which, in turn, excite atomic states of the crystal, which, for the systems here under consideration, results in a light emitting transition. Light so emitted, schematically depicted as rays 44, is sensed by a means such as photomultiplier tube 45 which, in turn, gives out an electrical signal, shown as 46, measured by means not shown. A more complete description of such devices is found in Beta- and Gamma-Ray Spectroscopy, Interscience Publishers, Inc., 1955, page 133 et seq.

The following examples illustrate conditions found appropriate for the reduction of rare earth inclusions in various fluoride lattices.

EXAMPLE 1

A crystal of calcium fluoride, $CaF_2$, containing 0.1 mol percent samarium fluoride, $SmF_3$, was cut into samples. One such sample, of dimensions approximately 8 mm. x 7 mm. x 4 mm., was polished and its surfaces cleaned in methyl alcohol. The crystal was dried and was then clamped between pyrolytic graphite contacts of the apparatus depicted in FIGS. 1 and 2. The crystalline sample was then raised to a temperature of 700° C. and a D-C potential of 10 volts was applied across the crystal and a series-connected 20,000 ohm resistor. Under these conditions, the current through the crystal was at a value of about 20 microamperes. Within minutes there was an appearance of a green coloration at the surface of the cathode accompanied by a deposit of calcium metal. Thereafter, the green color spread through the crystal, first covering the cathode surface and subsequently proceeding through the bulk, with, as has been noted, a sharp, moving interface separating the deep green portion of the crystal from the water-white portion, the latter containing the trivalent unconverted ion. Progression of the interface under the condition noted was at a rate of about .2 mm./hour, with about two-thirds of the crystal being converted in a period of fifteen hours. Microscopic examination of the green region showed no inclusions, precipitates, or damage of any kind. Parallel white light directed into the green region revealed no observable scattering except for a dim red glow attributed to the 7086 A. fluorescent line associated with a transition of $Sm^{2+}$. The green color is stable throughout the cooling process from 700° C. to room temperature and, also, as has been noted, upon subsequent heating to a temperature of about 200° C. for a period of one-half hour, which has been found sufficient to bleach out most of the green coloration in $CaF_2$ containing divalent samarium in which the samarium had been reduced by irradiation. This sample was cut, polished and pumped by a zenon flash lamp upon which stimulated coherent emission characteristic of divalent samarium was observed.

EXAMPLE 2

The procedure of Eample 1 was repeated, utilizing a crystal of calcium fluoride containing 0.5 mol percent of $Tm^{3+}$. The initially clear crystal after treatment was blue-red in appearance, indicating the presence of $Tm^{2+}$. Estimates based on fluorescent intensity indicate conversion of approximately 50 percent of $Tm^{3+}$ to the lower valence state.

EXAMPLE 3

The procedure of Example 1 was repeated on a crystal of calcium fluoride containing 1.0 mol percent of trivalent terbium and 0.2 mol percent of trivalent cerium. The initially clear crystal after treatment for approximately sixteen hours was of a deep brown coloration.

EXAMPLE 4

The procedure of Example 1 was repeated on a sample of calcium fluoride containing tetravalent uranium. The initially clear crystal was of deep red coloration, indicating the presence of trivalent uranium. Treatment time was approximately five hours.

EXAMPLE 5

A crystal of calcium fluoride containing trivalent dysprosium in an amount of approximately 0.1 mol percent was treated for a period of sixteen hours in accordance with the conditions set forth in Example 1. The initially clear crystal was after treatment of a blue coloration, so indicating the presence of divalent dysprosium.

EXAMPLE 6

A sample of strontium fluoride containing 0.01 mol percent samarium, initially of clear appearance, was converted to the deep blue coloration characteristic of trivalent samarium by treatment in accordance with the conditions set forth in Example 1.

EXAMPLE 7

A crystal of barium fluoride containing 0.01 mol percent samarium was treated in accordance with the conditions of Example 1 at a temperature of 900° C. The initially clear water-white crystal was converted to the deep green coloration characteristic of divalent samarium.

EXAMPLE 8

The conditions of Example 1 were utilized in the treatment of a thulium-containing sample of strontium fluoride. The initially clear water-white crystal had a wine-red coloration after treatment.

Other experimental work has resulted in the reduction of, inter alia, cerium, terbium, dysprosium, thulium, erbium, gadolinium, in strontium fluoride as well as calcium fluoride. In general, the ions chosen for the exemplary work noted include those which in the past have been reduced only with difficulty. The work thus far carried out is fairly indicative of the feasibility of converting any of the ions noted in any of the three preferred divalent fluoride hosts.

In conducting the experiments serving as basis for the examples, it was noted that the interface drift rate was faster in small cross section than in large for a given voltage. This is consistent with the postulated mechanism noted above in indicating a rate dependence on current rather than voltage.

In all of the examples above set forth, as well as in other work which has been carried out, absorption and emission spectra comparisons with published information (see, for example, 35 J. Chem. Phys., 1521 (1961)) indicated the presence of the reduced valence state noted in the colored regions.

The exemplary conditions noted above have been found suitable for the practice of the invention. These conditions may be generalized as follows. It having been found that the applied voltage gradient effectively results in the migration of other ionic materials, it may be deemed expedient to take precautions to exclude any such ionic materials which may be deleterious for a particular use. It has been noted that metallic ingredients are desirably excluded from contacting anodes, although the presence of such materials may be tolerated since the effect is oftentimes restricted to crystal surface damage. Oxygen is, for demanding applications, considered deleterious in that it may cause precipitation and consequent light scattering. For this reason, it is desirably removed from the crystal before treatment. Since it may be introduced from contaminated surfaces or from the atmosphere, precautions are taken to prevent its presence. While the drift mechanism is accelerated at higher temperature, it is generally desirable to maintain temperature below a maximum value at which hydrolysis is known to proceed. Approximate hydrolysis temperatures for the three principal crystalline hosts of concern are 800° C. for calcium fluoride, 900° C. for strontium fluoride, and 750° C. for barium fluoride. Where hydrolysis can be tolerated, there is an absolute maximum tolerable temperature corresponding with the melting points of the three materials. They are approximately 1400° C. for calcium fluoride, 1500° C. for strontium fluoride, and 1300° C. for barium fluoride. Operation to such maximum temperatures can be accomplished by use of a dry atmosphere such as HF. This ambient is particularly useful since fluorine body diffusion is faster than the in-diffusion rate. Such elevated temperatures may result in interface migration rates of up to 4000 mm./hr. 375° C. is considered a minimum temperature from the standpoint of expediency.

Voltage gradients applied across the crystal may be as little as about .1 volt per square centimeter and may be as great as 300 volts per square centimeter. Gradients of the order of 20 volts per square centimeter are considered preferred upper limits, with higher values resulting in surface migration of any ionic impurities that may be present. Higher values within the range set forth may be tolerated, particularly under clean conditions or with very large crystalline specimens and do result in a further acceleration of the drift mechanism.

The invention has been described in terms of a limited number of embodiments. Invention is premised on the effective reduction in valence state of rare earth inclusions in fluoride hosts, particularly in those of calcium, strontium, and barium. Alternative conditions, as well as the recognition of attendant effects which may be technologically valuable, are apparent. In the course of the described experiments, it has been noted that diffusion of other ionic materials, either into the crystal or out of the crystal, may occur. While it is desirable to avoid any such migration for certain of the purposes noted, certain of these may be of benefit. It is apparent, for example, that a desired distribution of an ionic material may be introduced during the drifting process. It is apparent that valence states of certain inclusions may be increased as well as decreased. The appended claims are considered to be of sufficient scope to include any such alternative conditions and any such effects which may be attendant upon the valence reduction drift process upon which the invention is primarily premised.

The examples are concerned with rare earth inclusions of the order of $10^{19}$ ions/cm.$^3$ of host material, and such materials are considered to be of interest for laser, scintillator, and other phosphor applications. Certain device uses may, however, be dependent upon the inclusion of such rare earths in amounts as small as $10^{17}$ ions/cm.$^3$ or as great as $10^{21}$ ions/cm.$^3$. Concentration of rare earth inclusion is dictated by the application for which the crystals are intended on the one hand and by maximum solubility on the other. It is the nature of the described invention that a significant portion of any such rare earth inclusions is reduced in valence by operation of the described processes. It has been noted that this is true in the instance of europium, where as little as 1 percent of such inclusion may be in the trivalent state as grown, for the usual rare earths where 99 percent or more of all inclusion is in the divalent state, and in the instance of uranium, where the natural compensated state is tetravalent. Appended claims are considered to be of such scope as to encompass all such materials.

What is claimed is:

1. Process for reducing the valence state of at least one rare earth selected from the group consisting of type $4f$ and type $5f$ in solution in a crystalline body consisting essentially of a divalent metal fluoride comprising heating said body to a temperature of at least 375° C. while maintaining a voltage gradient of from 0.1 volt to 300 volts per square centimeter across at least a portion of the said body for a period sufficient to result in reduction of at least a portion of the said rare earth.

2. Process in accordance with claim 1 in which the said divalent metal fluoride is a compound selected from the group consisting of calcium fluoride, strontium fluoride, and barium fluoride.

3. Process of claim 2 in which the said voltage gradient is maintained between the limits of .1 volt and 20 volts.

4. Process of claim 3 in which the said crystalline body consists essentially of calcium fluoride.

5. Proces of claim 3 in which the said crystalline body consists essentially of strontium fluoride.

6. Process of claim 3 in which the said crystalline body consists essentially of barium fluoride.

7. Process of claim 3 in which the rare earth is samarium.

8. Process of claim 3 in which the rare earth is thulium.

9. Process of claim 3 in which the rare earth is terbium.

10. Process of claim 3 in which the rare earth is uranium.

11. Process of claim 3 in which the rare earth is dysprosium.

12. Process is accordance with claim 3 in which the said voltage gradient is applied across contacting electrodes which are essentially metal free.

13. Process in accordance with claim 12 in which the said electrodes are carbon.

14. Crystalline body produced in accordance with the process of claim 1.

15. Laser including as an active element a crystalline body produced in accordance with the process of claim 1, together with means for introducing energy into the said rare earth so as to produce a metastable state capable of undergoing a light-emitting energy transition.

16. Scintillator including as an active element a crystalline body produced in accordance with the process of claim 1, together with means for irradiating said body with energy to be sensed and means for detecting light emanating from said body by reason of absorbed energy from the said irradiating source.

References Cited

UNITED STATES PATENTS 3,149,230    9/1964    Hall _____ 250—71.5

OTHER REFERENCES

Sorokin et al., Solid-State Optical Maser using Divalent Samarium in Calcium Fluoride, IBM Journal of Research and Development, vol. 5 (January 1961) pp. 56–58.

Kiss et al., "Pulsed and Continuous Optical Maser Action in $CaF_2:Dy^{2+}$" and "Optical Maser Action in $CaF_2:Tm^{2+}$." Proceedings of the IRE, vol. 50, No. 6 (June 1962) pp. 1531–1533.

Sorokin et al., Spectroscopy and Optical Maser Action in $SrF_2:Sm^{2+}$. Physical Review, vol. 127, No. 2 (July 15, 1962) pp. 503–508.

JEWELL H. PEDERSEN, Primary Examiner

W. L. SIKES, Assistant Examiner